(12) United States Patent
Pereira et al.

(10) Patent No.: US 9,677,967 B2
(45) Date of Patent: Jun. 13, 2017

(54) PRESSURE-SENSING HOSE

(75) Inventors: Luis R. Pereira, Menomonee Falls, WI (US); Hassan Al-Atat, Chaska, MN (US); Mark A. Juds, New Berlin, WI (US)

(73) Assignee: Eaton Corporation, Cleveland, OH (US)

( * ) Notice: Subject to any disclaimer, the term of this patent is extended or adjusted under 35 U.S.C. 154(b) by 1105 days.

(21) Appl. No.: 13/302,692

(22) Filed: Nov. 22, 2011

(65) Prior Publication Data

US 2012/0136592 A1 May 31, 2012

Related U.S. Application Data

(60) Provisional application No. 61/415,991, filed on Nov. 22, 2010.

(51) Int. Cl.
| | | |
|---|---|---|
| *G01L 7/00* | (2006.01) | |
| *G01M 5/00* | (2006.01) | |
| *F16L 11/08* | (2006.01) | |
| *F16L 33/207* | (2006.01) | |

(52) U.S. Cl.
CPC ......... *G01M 5/0025* (2013.01); *F16L 11/086* (2013.01); *F16L 33/2076* (2013.01); *G01M 5/0033* (2013.01); *G01M 5/0083* (2013.01)

(58) Field of Classification Search
CPC ........ G01F 1/363; G01F 1/698; G01F 23/263; G01F 23/266
USPC .................... 702/47, 50, 52; 703/2
See application file for complete search history.

(56) References Cited

U.S. PATENT DOCUMENTS

| | | |
|---|---|---|
| 2,291,070 A | 7/1942 | Bruno |
| 2,436,949 A | 3/1948 | Anderson |
| 4,029,889 A | 6/1977 | Mizuochi |
| 4,446,892 A | 5/1984 | Maxwell |
| 5,159,200 A | 10/1992 | Dunbar et al. |

(Continued)

FOREIGN PATENT DOCUMENTS

| | | |
|---|---|---|
| DE | 31 40 804 A1 | 4/1983 |
| DE | 40 03 788 A1 | 8/1991 |

(Continued)

OTHER PUBLICATIONS

Holland, Zita., Layered Polymer Whole Structure Health Monitoring Using Capacitance Sensing.,Jul. 6-9, 2010., IEEE/ASME International Conference on Advanced Intelligent Mechatronics., pp. 943-946.*

(Continued)

*Primary Examiner* — Gregory J Toatley
*Assistant Examiner* — Yoshihisa Ishizuka
(74) *Attorney, Agent, or Firm* — Merchant & Gould P.C.

(57) ABSTRACT

A pressure-sensing hose assembly and method of its use are disclosed. In an example aspect, the pressure sensing hose assembly includes a hose assembly including a hose having first and second conductive layers and a circuit electrically connected to the first and second conductive layers of the hose assembly. The circuit generates an electrical response across the first and second conductive layers of the hose assembly. The pressure-sensing hose assembly further includes a computing system configured to receive the electrical response and estimate a pressure within the hose assembly based on the electrical response.

14 Claims, 14 Drawing Sheets

(56) References Cited

U.S. PATENT DOCUMENTS

| | | | |
|---|---|---|---|
| 5,267,670 | A | 12/1993 | Foster |
| 5,343,738 | A | 9/1994 | Skaggs |
| 5,387,899 | A | 2/1995 | DiLauro et al. |
| 5,551,484 | A | 9/1996 | Charboneau |
| 5,634,497 | A | 6/1997 | Neto |
| 5,671,689 | A * | 9/1997 | Clapp et al. ............... 112/278 |
| 5,969,618 | A | 10/1999 | Redmond |
| 5,992,218 | A | 11/1999 | Tryba et al. |
| 6,386,237 | B1 | 5/2002 | Chevalier et al. |
| 6,498,991 | B1 | 12/2002 | Phelan et al. |
| 6,735,705 | B1 | 5/2004 | Egbert et al. |
| 6,958,615 | B2 | 10/2005 | Poulbot et al. |
| 7,555,936 | B2 | 7/2009 | Deckard |
| 8,087,430 | B1 | 1/2012 | Betz et al. |
| 8,183,872 | B2 | 5/2012 | Stark |
| 8,217,669 | B1 | 7/2012 | Watkins, Jr. |
| 8,515,687 | B2 | 8/2013 | Pereira et al. |
| 8,829,929 | B1 | 9/2014 | Watkins, Jr. |
| 8,997,792 | B2 | 4/2015 | Betsinger et al. |
| 2001/0018845 | A1 | 9/2001 | Roberts |
| 2002/0154029 | A1 | 10/2002 | Watters et al. |
| 2003/0164048 | A1 | 9/2003 | Shkel |
| 2004/0065377 | A1 | 4/2004 | Whiteley |
| 2006/0196252 | A1* | 9/2006 | Deckard ..................... 73/49.5 |
| 2006/0226701 | A1 | 10/2006 | Gatz et al. |
| 2007/0051166 | A1 | 3/2007 | Baker et al. |
| 2007/0131035 | A1 | 6/2007 | Krutz et al. |
| 2008/0036617 | A1 | 2/2008 | Arms et al. |
| 2010/0007325 | A1 | 1/2010 | Stark |
| 2010/0174495 | A1 | 7/2010 | Pereira et al. |
| 2011/0152024 | A1 | 6/2011 | Kuehl |
| 2011/0226302 | A1 | 9/2011 | Farmer et al. |
| 2011/0281488 | A1 | 11/2011 | Li |
| 2012/0136592 | A1* | 5/2012 | Pereira et al. ................ 702/50 |
| 2012/0204923 | A1 | 8/2012 | Ortiz et al. |
| 2012/0278018 | A1 | 11/2012 | Hastreiter |
| 2014/0076449 | A1 | 3/2014 | Betsinger et al. |
| 2014/0238109 | A1 | 8/2014 | Wells et al. |
| 2014/0265561 | A1 | 9/2014 | Beining |
| 2015/0177172 | A1 | 6/2015 | Upasani et al. |
| 2015/0240972 | A1 | 8/2015 | Betsinger |

FOREIGN PATENT DOCUMENTS

| | | |
|---|---|---|
| EP | 1 126 205 A1 | 8/2001 |
| EP | 1 722 217 A1 | 11/2006 |
| EP | 2 261 546 A1 | 12/2010 |
| WO | WO 03/079749 A2 | 10/2003 |
| WO | WO 2008/001238 A2 | 1/2008 |
| WO | WO 2008/059226 A2 | 5/2008 |
| WO | WO 2012/012482 A1 | 1/2012 |
| WO | WO 2012/071424 A2 | 5/2012 |
| WO | WO 2012/149161 A1 | 11/2012 |

OTHER PUBLICATIONS

Holland, Z. et al., "Layered Polymer Whole Structure Health Monitoring Using Capacitance Sensing," *2010 IEEE/ASME International Conference on Advanced Intelligent Mechatronics*, Montreal, Canada, pp. 943-946 (Jul. 6-9, 2010).

International Search Report and Written Opinion mailed May 21, 2012.

International Search Report and Written Opinion for PCT Application No. PCT/US2012/035216, mailed Jul. 16, 2012, 14 Pages.

International Search Report and Written Opinion for PCT Application No. PCT/US2014/017590, mailed Jun. 3, 2014, 11 Pages.

International Search Report for PCT Application No. PCT/IN2012/000296, mailed Nov. 27, 2012, 2 Pages.

International Search Report for PCT Application No. PCT/US2013/059465, mailed Dec. 3, 2013, 3 Pages.

International Search Report and Written Opinion for PCT Application No. PCT/US2013/059473, mailed Jul. 18, 2014, 15 Pages.

Invitation to Pay Additional Fees (w/Partial International Search) for PCT Application No. PCT/US2013/059473, mailed Feb. 28, 2014, 6 Pages.

International Search Report and Written Opinion for PCT Application No. PCT/US2014/029286; mailed Jun. 18, 2014, 13 Pages.

Radtke, I. et al., "Design of Power-Transmitting Hydraulic Hose with Integrated Controller Area Network and Life-Sensing Capability," *2005 Agricultural Technology Conference Sponsored by ASAE*, 1 page (2005).

International Search Report for Application No. PCT/US2013/030966 mailed Aug. 1, 2013.

Invitation to Pay Additional Fees with Partial International Search for Application No. PCT/US2013/048660 mailed Mar. 24, 2014.

International Search Report and Written Opinion for Application No. PCT/US2013/048660 mailed Sep. 8, 2014.

Hewlett Packard Technical Manual, printed Apr. 24, 2003, 8 Pages.

Guo, Z. et al., "GRE: Graded Residual Energy Based Lifetime Prolonging Algorithm for Pipeline Monitoring Sensor", *9th International Conference on Parallel and Distributed Computing Applications and Technologies*, 203-210 (2008).

Mohamed, M. et al., "Power Harvesting for Smart Sensor Networks in Monitoring Water Distribution System", *International Conference on Networking, Sensing and Control*, 393-398 (2011).

Ok, C. et al., "Optimal Transmission Power in Self-sustainable Sensor Networks for Pipeline Monitoring", *IEEE International Conference on Automation Science and Engineering*, 591-596 (2007).

* cited by examiner

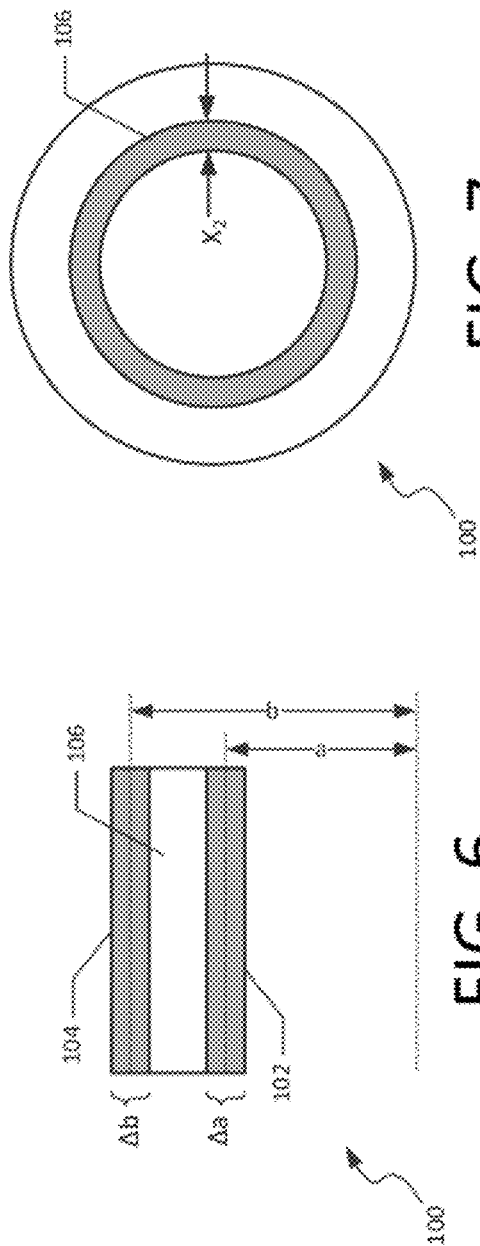
FIG. 7
FIG. 6
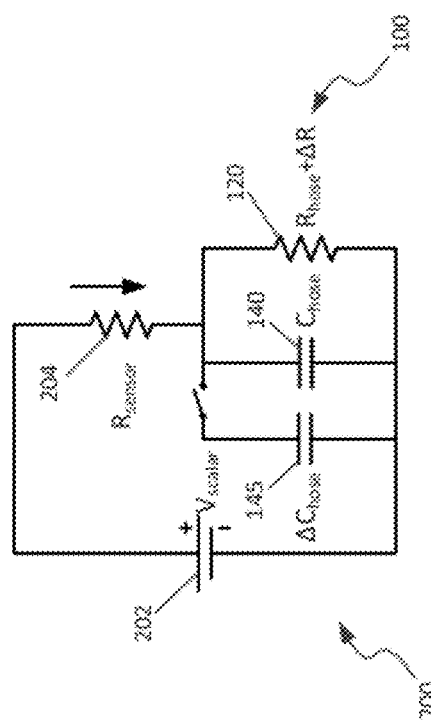
FIG. 8

PRESSURE-SENSING HOSE

CROSS REFERENCE TO RELATED APPLICATIONS

The present application claims priority to U.S. Provisional Patent Application No. 61/415,991, filed Nov. 22, 2010, the disclosure of which is hereby incorporated by reference in its entirety.

TECHNICAL FIELD

The present disclosure relates to methods and systems for measuring characteristics of a hose; in particular, the present disclosure relates to a pressure-sensing hose.

BACKGROUND

High pressure reinforced hydraulic hose is typically used on a variety of fluid power operated machines, such as earth-moving machines, to provide a flexible connection between several moving parts of a hydraulic circuit employed on or within the machine. Such hoses may include a hollow polymeric inner tube on which successive cylindrical layers of reinforcing material, such as wire or textile, are concentrically applied to contain the radial and axial pressures developed within the inner tube.

Many applications are demanding hose constructions with both high burst strength and long term fatigue resistance. Using conventional technology, the burst strength of a hose design may be increased by adding additional reinforcing material and/or layers, a practice which is generally discouraged because of its negative impact on the flexibility of the hose, or by universally increasing the tensile strength of each layer of reinforcement material, which may come at the expense of hose fatigue resistance.

To determine the robustness of a hose design, a hose manufacturer typically performs, among other tests, an impulse test and a burst test on the hose. An impulse test measures a hose design's resistance to fatigue failure by cyclically subjecting the hose to hydraulic pressure. A burst test, on the other hand, is a destructive hydraulic test employed to determine the ultimate strength of a hose by uniformly increasing internal pressure until failure. Based on these and other tests, a manufacturer can estimate a hose life that can be used to determine when a hose has reached the end of its life and may require replacing.

In some circumstances, it is desirable to detect, in a non-destructive and non-disruptive manner a likelihood of failure of a hydraulic hose. One solution providing this capability is discussed in U.S. Pat. No. 7,555,936, and discloses connecting a monitor circuit between two parallel, at least partially-conductive layers of a hose wall. A change in an electrical property observed by that monitor circuit may indicate a change in a property of the hose wall structure that might indicate impending failure of the hose wall. However, even with this solution, it can be difficult to determine whether the changed electrical property is in fact due to a change in a physical feature of a hose wall, or if the changed electrical property is due to a change in the sensing electronics, a change in an electrical property of a harness connecting the monitoring circuit to the hose wall, or simply degradation of an electrical connection to the hose wall. In these cases, there may be a change in an electrical property observed, even when hose wall integrity is not compromised, but instead is due to a change in position or pressure within the hose. This is because existing solutions do not account for pressure within a hose, either for monitoring purposes or for compensating for pressure effects on failure sensing circuitry.

SUMMARY

In a first example aspect, a pressure sensing hose assembly includes a hose assembly including a hose having first and second conductive layers and a circuit electrically connected to the first and second conductive layers of the hose assembly. The circuit generates an electrical signal across the first and second conductive layers of the hose assembly, which generates an electrical response to the electrical signal. The pressure-sensing hose assembly further includes a computing system configured to receive the electrical response and estimate a pressure within the hose assembly based on the electrical response.

In a second example aspect, a method of sensing an internal pressure of a hose assembly includes applying an electrical signal to a hose assembly and calculating at least one electrical property of the hose assembly based on a response of the hose assembly to the electrical signal. The method also includes estimating a pressure within the hose assembly based on the electrical response.

In a third example aspect, a method of sensing an internal pressure of a hose assembly includes applying a voltage across first and second concentric conductive layers of a hose assembly separated by an elastomeric insulating layer, and determining a voltage drop across the hose assembly. The method further includes calculating a resistance and a capacitance of the hose assembly based on the voltage drop across the hose assembly, and estimating a change in wall thickness of the hose assembly based at least in part on the resistance and the capacitance. The method also includes applying a hysteresis model to the estimated change in wall thickness to estimate pressure within the hose assembly.

BRIEF DESCRIPTION OF THE DRAWINGS

FIG. 6 is a schematic axial cutaway view of a portion of a hose assembly, according to an example embodiment.

FIG. 7 is a schematic cross-sectional view of a model of a pressurized hose assembly.

FIG. 8 is an electrical schematic model of a pressurized hose assembly.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Generally, the present disclosure relates to methods and systems for determining an internal pressure of a hose assembly. According to various embodiments discussed herein, a hose assembly including concentric conductive layers can be modeled as a coaxial cable having an electrical response that changes with pressure. By accounting for hysteresis effects of an elastomer layer between the conductive layers, it is possible to estimate a current pressure within the hose assembly based on the electrical response of the hose over time. This allows a user of a hydraulic hose to be able to monitor pressure within the hose with reasonable accuracy, and without requiring a separate pressure gauge or other instrument.

Figure 1:
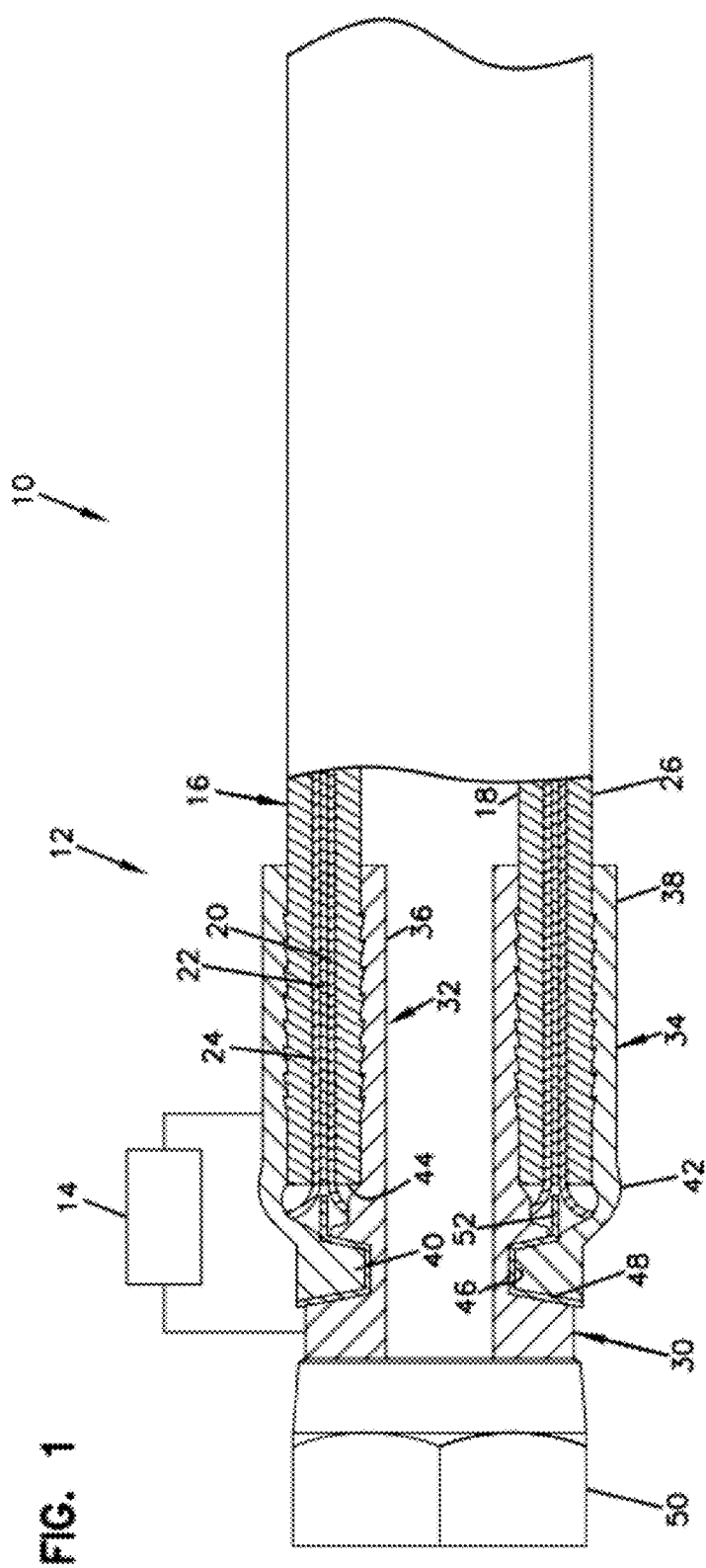
FIG. 1 is a partial cross-sectional view of an exemplary hose assembly employing a fault detector having exemplary features of aspects in accordance with the principles of the present disclosure.

Referring now to FIG. 1, an exemplary hose monitoring system, generally designated 10, is shown. The hose monitoring system 10 includes a hose assembly, generally designated 12, and a monitoring assembly 14 in electrical and physical communication with the hose assembly 12. The hose monitoring system 10 can be used, for example, to determine current operational characteristics of the hose assembly 12, such as the current pressure within the hose assembly 12, or to monitor degradation and/or failures in the hose assembly.

The hose assembly 12 includes a hose, generally designated 16, having a multi-layer construction. In the subject embodiment, the hose 16 is generally flexible and includes an inner tube 18 made from a polymeric material, such as rubber or plastic, or another material depending on the requirements of the particular application, a first conductive layer 20, an intermediate layer 22, a second conductive layer 24 and an outer cover 26. The first and second conductive layers 20, 24 define an electrical characteristic of the hose assembly 12, such as capacitance, inductance and/or resistance (impedance).

In the subject embodiment, the first conductive layer 20 overlays the inner tube 18 and the intermediate layer 22 overlays the first conductive layer 20. The second conductive layer 24 overlays the intermediate layer 22. The first and second conductive layers 20, 24 may be configured as reinforcing layers. The outer cover 26 may overlay the second conductive layer 24, and may include, for example, an extruded layer of rubber or plastic. The outer cover 26 may itself include a reinforcing layer.

The intermediate layer 22 operates to at least partially insulate electrically the first and second conductive layers 20, 24 from one another. The intermediate layer 22 may have any of a variety of constructions. For example, the intermediate layer 22 may consist of a single layer of an electrically resistive material. The intermediate layer 22 may also consist of multiple layers, wherein at least one of the layers exhibits electrical insulating properties. Certain composite materials may also be employed in the intermediate layer 22, such as a woven fabric bonded to a polymeric material. Composite materials having various other constructions may also be utilized. Composite materials may also be used in combination with other materials to form the intermediate layer 22.

The first and second conductive layers 20, 24 generally extend the entire length and span the entire circumference of the hose. This is generally the case when the conductive layer also functions as a reinforcement layer. The intermediate layer 22 may also extend over the entire length and circumference of the hose. There may be instances, however, where at least one of the first and second conductive layers 20, 24 extends only over a portion of the hose length and/or a portion of its circumference. In that instance, the intermediate layer 22 may also be configured to generally extend over the region of the hose containing the partial conductive layer 20, 24. The partial intermediate layer 22 may be positioned within the hose so as to separate the first and second conductive layers 20, 24 from one another.

Figure 2:
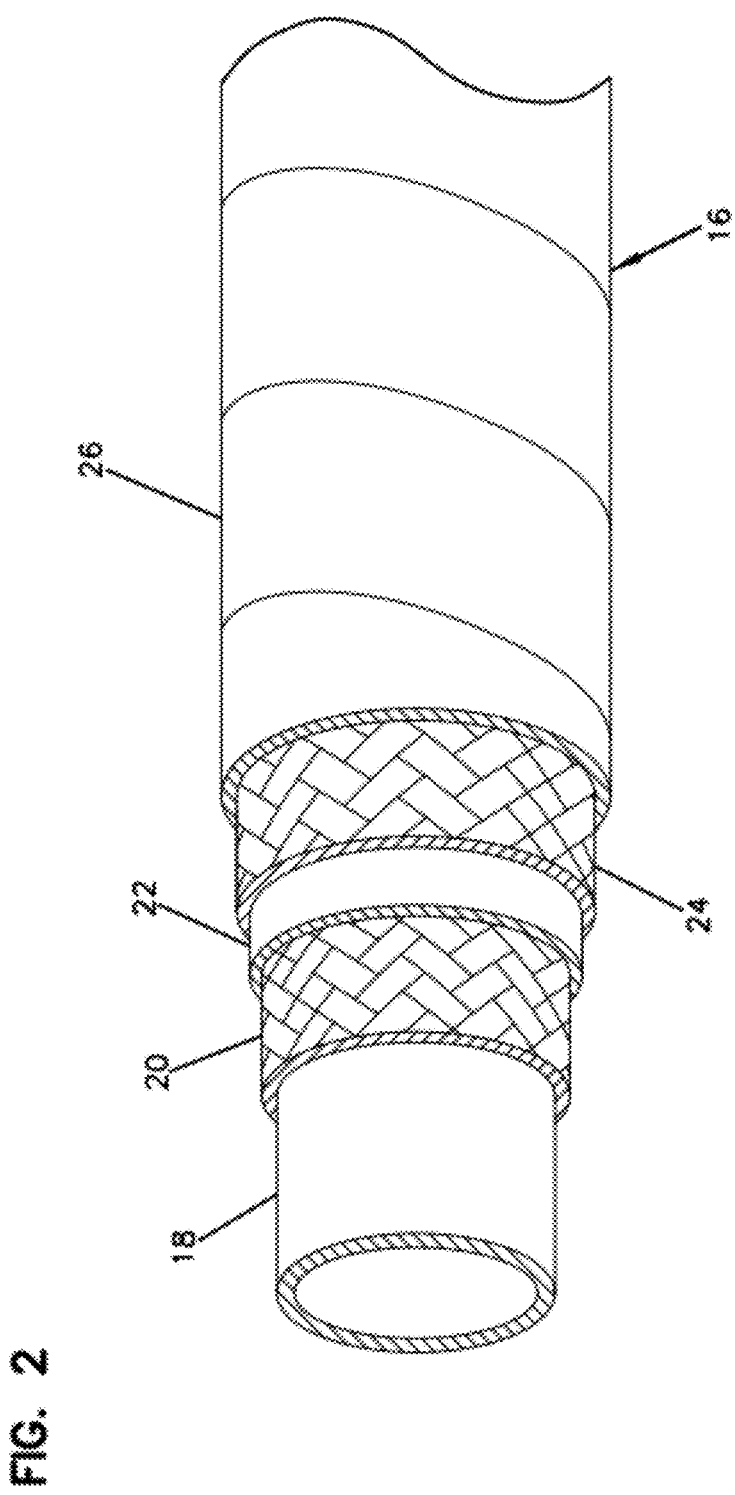
FIG. 2 is a perspective view, partially cut away, illustrating an exemplary hose employing a braided conductive layer that is suitable for use with the hose assembly of FIG. 1.
Figure 3:
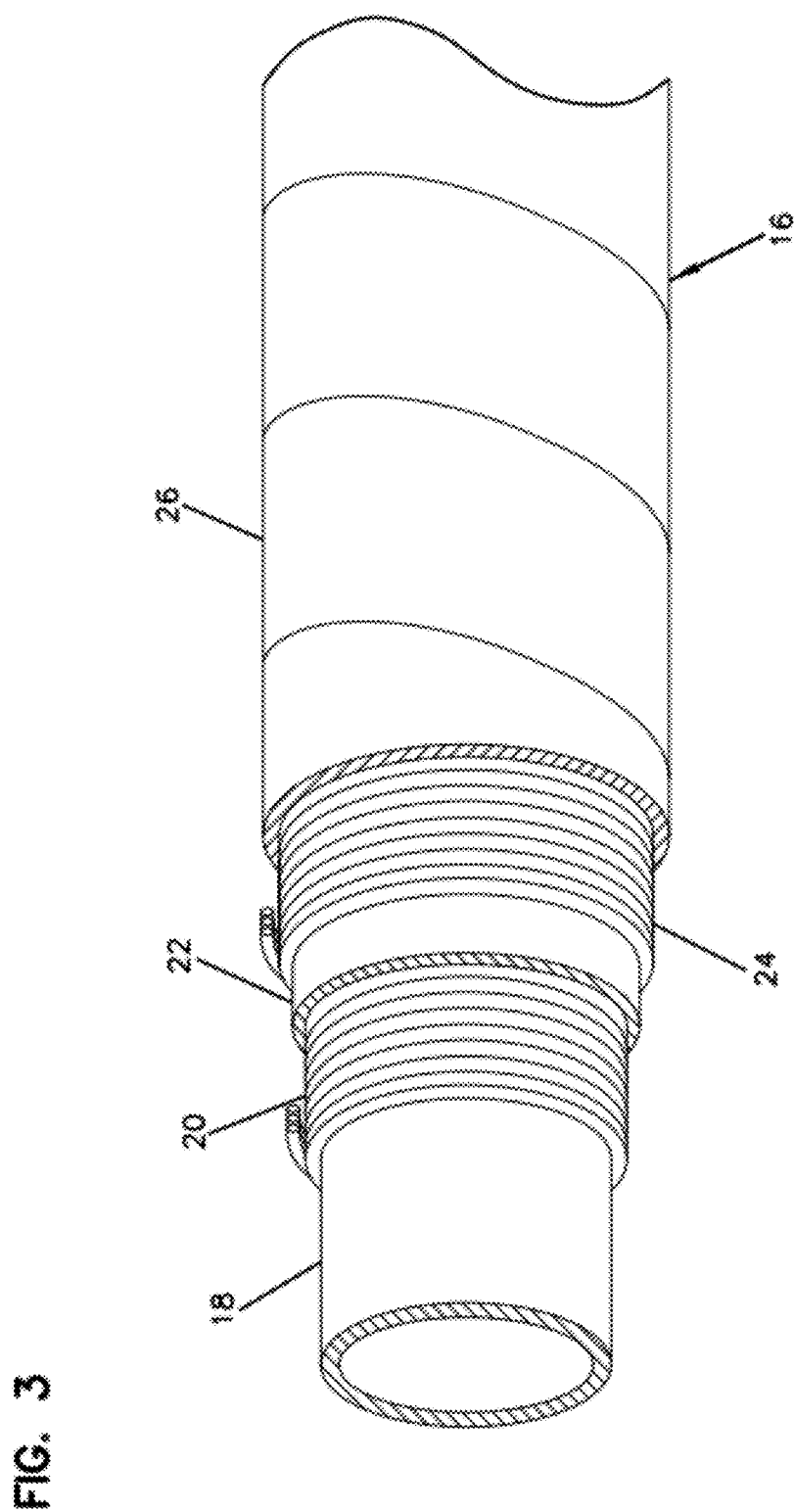
FIG. 3 is a perspective view, partially cut away, illustrating an exemplary hose employing a spiral wire conducting layer that is suitable for use with the hose assembly of FIG. 1.

Referring now to FIGS. 2 and 3, the first and second conductive layers 20, 24 may include, for example, an electrically conductive braided reinforcement material, such as shown in FIG. 2, or alternating layers of electrically conductive spiral reinforcement material, such as shown in FIG. 3. The braided reinforcement material may consist of a single layer or may include multiple layers. Although a two-wire spiral reinforcement arrangement is depicted in FIG. 3, it shall also be appreciated that other configurations, such as four and six wire arrangements, may also be utilized.

The first and second conductive layers 20, 24 may each have the same configuration, or each layer may be configured differently. For example, the first and second conductive layers 20, 24 may each include the braided material shown in FIG. 2, or one of the first and second conductive layers 20, 24 may include the braided material while the other of the first and second conductive layers 20, 24 may include the spiral reinforcement material shown in FIG. 3. Additionally, the first and second conductive layers 20, 24 may include a single ply or multiple plies of reinforcement material. The first and second conductive layers 20, 24 may comprise metal wire, natural or synthetic fibers and textiles, and other reinforcement materials, provided the selected material is electrically conductive.

Referring again to FIG. 1, the hose assembly 12 may include a hose fitting, generally designated 30, for fluidly coupling the hose 16 to another component. The hose fitting 30 may have any of a variety of different configurations depending, at least in part, on the requirements of the particular application.

In the subject embodiment, the hose fitting 30 includes a nipple, generally designated 32, that engages the inside of the hose 16 and a socket, generally designated 34, that engages the outside of the hose 16. The nipple 32 includes an elongated cylindrical end portion 36 that engages the inner tube 18 of the hose 16. A cylindrically shaped end portion 38 of the socket 34 engages the outer cover of the hose 16. The socket 34 and nipple 32 may be constructed from an electrically conductive material.

The socket 34 and nipple 32 can be secured to the hose 16 by crimping the end portion 38 of the socket 34 overlaying the hose 16. The crimping process deforms the end portion 38 of the socket 34, thereby compressing the hose 16 between the nipple 32 and the socket 34. In the subject embodiment, the portions of the nipple 32 and the socket 34 that engage the hose 16 include a series of serrations that at least partially embed into the relatively softer hose material when the socket 34 is crimped to help secure the hose fitting 30 to the hose 16. The serrations may be configured to prevent the serrations from penetrating the inner tube and outer cover and contacting the first and second conductive layers 20, 24.

In the subject embodiment, the socket 34 includes an inwardly extending circumferential lug 40 positioned near an end 42 of the socket 34 adjacent an end 44 of the hose 16. The lug 40 engages a corresponding circumferential slot 46 formed in the nipple 32 for securing the socket 34 to the nipple 32. The end 42 of the socket 34 having the lug 40 is initially formed larger than the nipple 32 to enable the socket 34 to be assembled onto the nipple 32. During the assembly process the end 42 of the socket 34 is crimped, which deforms the socket 34 and forces the lug 40 into engagement with the corresponding slot 46 in the nipple 32. The socket 34 can be electrically insulated from the nipple 32 by positioning an electrically insulating collar 48 between the socket 34 and nipple 32 at the point the lug 40 engages the slot 46.

The hose fitting 30 also includes a nut 50 attached to the nipple 32. The nut 50 provides a means for securing the hose assembly 12 to another component.

The first conductive layer 20 may be configured to extend beyond the end of the inner tube of the hose 16. The first conductive layer 20 may engage the nipple 32 to create an electrical connection between the nipple 32 and the first conductive layer 20. Similarly, the second conductive layer 24 may be configured to extend beyond an end of the outer cover of the hose 16. The second conductive layer 24 may engage the socket 34 to create an electrical connection between the socket 34 and the second conductive layer 24.

To help prevent the portions of the first and second conductive layers 20, 24 that extend beyond the end of the hose 16 from contacting one another, an electrically insulating spacer 52 may be positioned between the exposed ends of the first and second conductive layers 20, 24. The spacer 52 may be integrally formed as part of the collar 48 used to electrically insulate the socket 34 from the nipple 32. The spacer 52 may also be formed by extending the intermediate layer 22 of the hose 16 beyond an end of the inner tube 18 and outer cover 26. The spacer 52 may also be configured as a stand alone component separate from the collar 48 and the intermediate layer 22 of the hose 16.

The monitoring assembly 14 may have any of a variety of configurations. In general, the monitoring assembly 14 is connectable over a portion of the hose assembly 12, in particular the portion illustrated in FIG. 1. The monitoring assembly 14, when installed over hose assembly 12, forms a physical and electrical connection with the hose assembly 12, and in particular to nipple 32 and socket 34, respectively. Generally, the monitoring assembly 14 detects an electrical characteristic of the hose assembly 12, while validating the connection to the nipple 32 and socket 34. An exemplary monitoring assembly 14 is described in further detail below, in connection with FIGS. 4-17.

Figure 5:
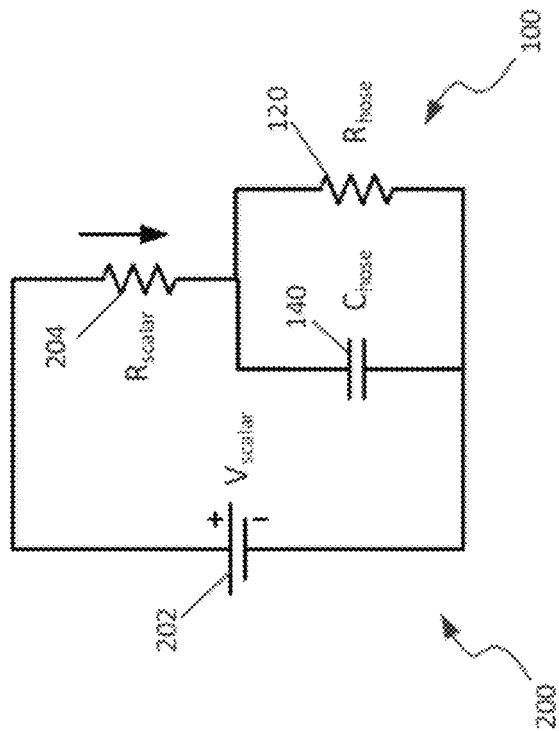
FIG. 5 is an electrical schematic model of the hose assembly of FIG. 4.
Figure 4:
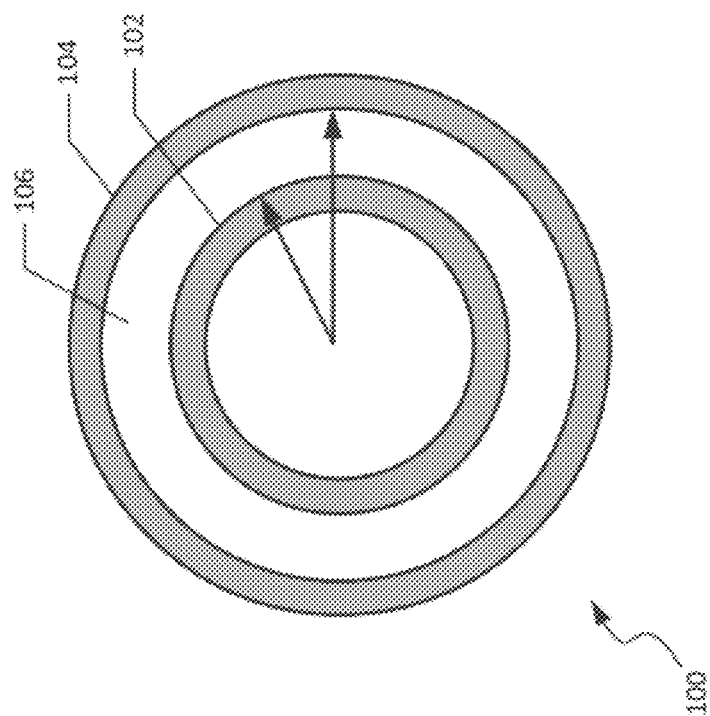
FIG. 4 is a schematic cross-sectional view of a model of the hose assembly of FIGS. 1-3.

Referring now to FIGS. 4-5, schematic representations of the hose assembly 12 and a monitoring circuit that can be included in a monitoring assembly 14 are provided. In FIG. 4, a cross-sectional, schematic physical representation of a hose assembly 100 is shown. The hose assembly 100 schematically appears as a coaxial cable, with concentric first and second conductive layers 102, 104, respectively. The first and second conductive layers 102, 104 can, in some embodiments, correspond to layers 20, 24 of FIGS. 1-3, above.

An elastomeric layer 106 resides between the first and second conductive layers 102, 104, and acts as an insulator electrically separating the layers. Accordingly, and as shown in FIG. 5, the hose assembly 100 can be represented as a parallel capacitor 140 and resistor 120 (i.e., modeled on a coaxial cable arrangement).

It is noted that, in FIG. 4, the facing portions of conductive layers 102, 104 separated by the elastomeric layer 106, would act as separated capacitor plates, with a separate resistive component. Accordingly, as shown in FIG. 5, a monitoring circuit 200 can take the form of a voltage ($V_{sensor}$) 202 and resistance applied to a first of the conductive layers, and a response can be detected on the second of the conductive layers. As such, a voltage ($V_{hose}$) at the point between the resistance 204 and the hose assembly 100 (represented schematically by the parallel resistor 120 and capacitor 140) indicates the proportion of the overall voltage ($V_{sensor}$) 202 attributable to a drop across the resistance ($R_{sensor}$) 204 or across the hose assembly 100.

To assess the electrical response of the hose assembly of FIGS. 4-5, various physical characteristics of the hose assembly are accounted for, including the resistivity ($\rho$) of the elastomer layer 106, as well as the permittivity ($\epsilon$) of the elastomer, and the length (L) of the hose. Additionally, the radial position of the conductive layers 102, 104 is also accounted for (distances a and b, respectively). As such, when a DC voltage, such as voltage ($V_{sensor}$) 202 is applied in the monitoring assembly 200, the resistor ($R_{hose}$) 120 and capacitor ($C_{hose}$) 140 can be represented by the following equations:

$$R = \frac{\rho}{2\pi L}\ln\left(\frac{b}{a}\right) \quad \text{(resistor 120)}$$

$$C = \frac{2\pi\epsilon L}{\ln\left(\frac{b}{a}\right)} \quad \text{(capacitor 140)}$$

As such, based on the change in distances a and b, as pressure within the hose assembly 100 increases, resistance 120 of the hose assembly 100 decreases, but capacitance 140 increases.

Additionally, due to the capacitive effect of the hose assembly 100, the hose assembly has an electrical characteristic that is responsive to voltage changes over time. In particular, when a voltage is initially applied, the voltage response across the hose as a function of time can be represented by the voltage divider and RC circuit equation expressed below:

$$V_{hose}(t) = \frac{R_{hose} * V_{sensor}}{R_{hose} + R_{sesnsor}}\left(1 - e^{-\frac{t}{(R_{hose}||R_{sensor})*C_{hose}}}\right)$$

Accordingly, when the switch is closed, the current going through the capacitor will spike and exponentially decrease until the capacitor is fully charged to the settling (DC) voltage. The time it takes the capacitor to fully charge to the settling voltage is dependent on time constant τ, which can be detected from:

$$\tau = (R_{hose} \| R_{sensor}) * C_{hose}$$

Although the model described in FIGS. 4-5 provides an accurate estimate of electrical response of a hose assembly in the event where conditions remain constant, it does not account for changes in the electrical properties if a hose assembly in the event of pressure changes within the hose assembly. In particular, when the fluid passes through the hose it exerts an internal pressure on the walls of the hose. The internal pressure will cause stress in the walls of the hose and would thus cause the walls to contract. As illustrated in FIGS. 6-9, various geometrical features of a hose assembly 100 may change as pressure within the hose assembly changes. In FIG. 6, an axial cross-section of one wall of a hose assembly is shown, with first and second conductive layers 102, 104 positioned at distances a and b from a center axis of the hose assembly, and separated by the elastomeric layer 106. As pressure changes in the hose assembly, both the first and second layers may be compressed, and may change thickness by different amounts Δa, Δb, respectively. Additionally, as illustrated in FIG. 7, the thickness of the elastomer layer 106 can be represented as the difference between distances b and a (i.e., distances from the center axis of the hose to the center axis of each of the conductive layers 102, 104), as adjusted by half the compression distance of the conductive layers:

$$T = b - a - \frac{\Delta b}{2} - \frac{\Delta a}{2}$$

In addition, since resistance and capacitance are proportional to the natural log of the proportion of distances (ln(b/a)), the proportional resistance and capacitance can be expressed as a function of the thickness of the elastomer layer:

$$\text{Ln}\left(\frac{b}{a}\right) = \text{Ln}\left(1 + \frac{T}{a} - \frac{\Delta b}{2} - \frac{\Delta a}{2}\right)$$

As specifically illustrated in FIG. 7, because pressure varies as a function of time t, it will cause $X_2(t)$ to change, which refers to a change in elastomer thickness over time. This will accordingly cause the elastomer thickness ($T-X_2(t)$) to vary. So, the quantity Ln(b/a) will vary over time with pressure changes as follows:

$$\text{Ln}\left(\frac{b}{a}\right) = \text{Ln}\left(1 + \frac{T - X_2(t)}{a} - \frac{\Delta b}{2a} - \frac{\Delta a}{2a}\right)$$

As observed, as pressure increases, the distance X2 decreases, and therefore the thickness ($T-X_2(t)$) will decrease. Additionally, the resistance will decrease by ΔR, and capacitance will increase by ΔC. Specifically, a hose resistance will change as follows:

$$R_{hose}(t) = \frac{\rho}{2\pi L}\ln\left(\frac{b}{a}\right) = \frac{\rho}{2\pi L}\ln\left(\frac{a + T - X_2(t) - \Delta b/2 - \Delta a/2}{a}\right)$$

Additionally, the change in thickness of the elastomer will change as follows:

$$X_2(t) = a + T - \frac{\Delta a}{2} - \frac{\Delta b}{2} - ae^{\left(\frac{R_{hose}(t)*2\pi L}{\rho}\right)}$$

Accordingly, both the resistance and capacitance of the hose assembly will change in response to changes in pressure internal to the hose. Referring specifically to FIG. 8, a modified electrical schematic model of the hose assembly 100 is illustrated, as compared to the arrangement shown in FIG. 5. As shown, an additional adjustment to the capacitance 145, illustrated as ΔC, and an additional adjustment to the resistance (shown as ΔR, as a portion of resistor 120) are illustrated.

In FIG. 8, it is noted that the settling time for the hose assembly 100 varies according to the particular pressure present in the hose as well. Specifically, the settling time of the voltage drop across the hose will vary according to the resistance 120 ($R_{hose}$):

$$V_{hose}(t) \approx \frac{R_{hose} * V_{sensor}}{R_{hose} + R_{sesnsor}}$$

Additionally, the hose resistance will change over time as a function of pressure:

$$R_{hose}(t) \approx \frac{R_{sensor} * V_{hose}}{V_{sensor} - V_{hose}}$$

This leads to a model of a change in thickness of the elastomer layer 106 being a function of various hose parameters and sensed voltages as follows:

$$X_2(t) = a + T - \frac{\Delta b}{2} - \frac{\Delta a}{2} - ae^{\left(\frac{R_{sensor}*V_{hose}(t)*2\pi L}{\rho*(V_{sensor}-V_{hose}(t))}\right)}$$

Figure 9:
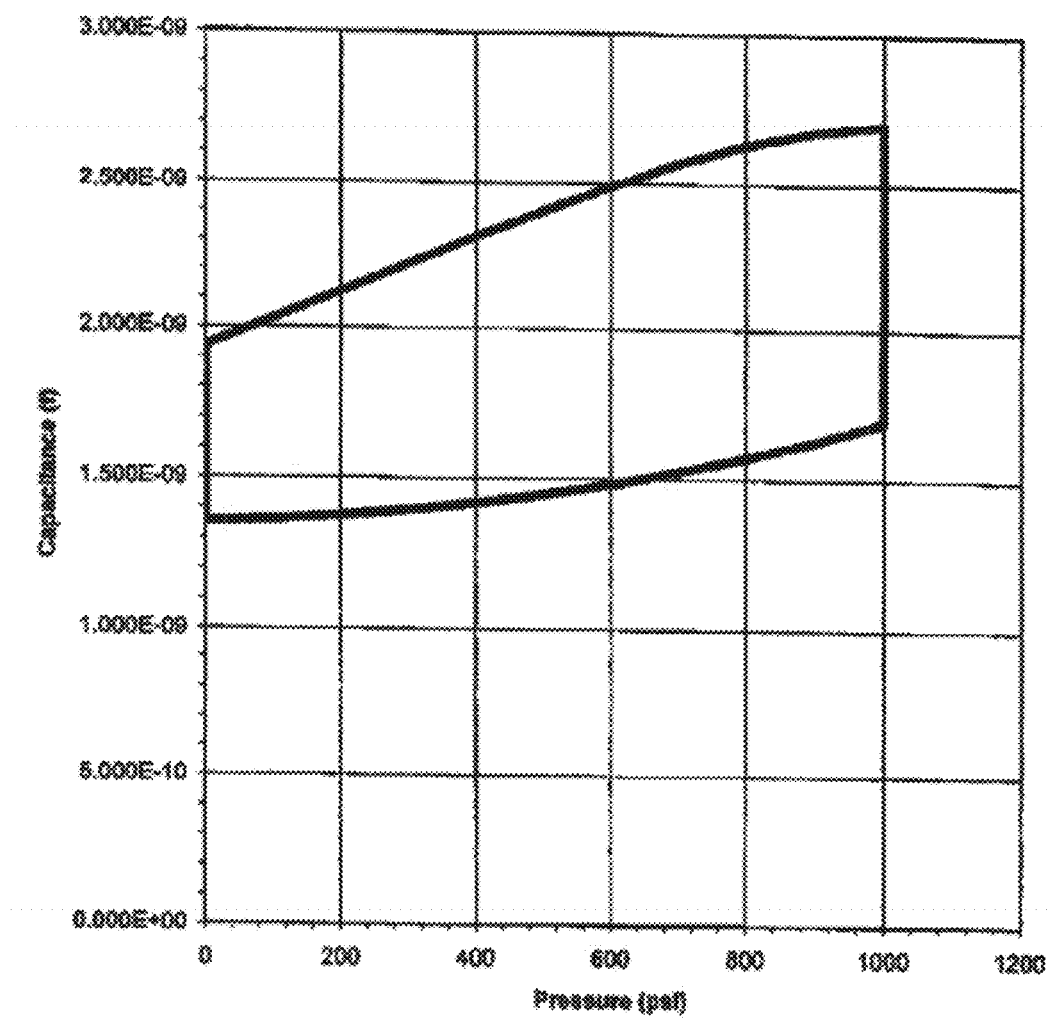
FIG. 9 is a hysteresis model illustrating elasticity responsiveness of an insulating layer included in a hose assembly according to embodiments of the present disclosure.

In addition to the above estimate of a change in thickness of the elastomer layer 106 as a function of sensed voltages, it is possible to then extrapolate an estimate of pressure within the hose assembly 100 based on those same observed voltages. However, due to the elastomeric nature of the insulating elastomer layer 106, the relationship between displacement of the elastomer layer 106 and the fluid pressure within the hose assembly 100 is not perfectly correlated, but instead follows a hysteresis model. Referring now to FIG. 9, a chart 300 showing a first experimental example of observed hysteresis illustrating elasticity responsiveness of an insulating layer included in a hose assembly according to embodiments of the present disclosure. As illustrated, the example uses the values outlined in Table 1, below, to empirically derive a hysteresis model for the elastomeric layer 106 of the hose assembly. For example, a switching input pressure can be applied to a hose assembly 100 and a voltage response recorded to determine the resistance and capacitive effect of the hose assembly.

TABLE 1

Experimental Characteristics of Hose Assembly for Hysteresis Model

|  |  |  | Input | Meters |
|---|---|---|---|---|
| Hose Geometry | | | | |
| Mean Diameter | D | in | 1.000 | 0.0254 |
| Length | L | in | 48.000 | 1.2192 |
| Thickness | T | in | 0.100 | 0.0025 |
| Hose Material Properties | | | | |
| Dielectric Constant | $\epsilon r$ | — | | 4 |
| 1st Spring Constant | k1 | psi/in | 1.00E+12 | >1.00E+12 |
| 2nd Spring Constant | k2 | psi/in | 20,000 | >20,000 |
| Damping Constant | k3 | psi/(in/sec) | 200,000 | |
| Pressure Cycle | | | | |
| Peak Pressure | P | psi | 1,000 | |
| Cycle Time | tc | sec | 10 | |
| Steady State Deflection | X2max | in | 0.0500 | |
| Constants | | | | |
| Permitivity of Space | $\epsilon 0$ | f/m | 8.85E-12 | |

From this measurement of pressure and calculation of capacitance as a function of the response of $V_{hose}$ to a switching pressure input, a relationship can be extrapolated from the chart 300 as follows:

$$C = \varepsilon_r \varepsilon_0 \frac{\pi DL}{T - x_2}$$

Furthermore, a compression of the elastomeric layer 106 of the hose assembly can be represented as a function of the thickness of the layer 106 at atmospheric pressure as adjusted by the hose pressure as affected by constants dictated by the parameters relating to materials used in the hose assembly:

$$x_2 = x_0 e^{-t(k_2/k_3)} + P\left(\frac{1}{k_2} + \frac{1}{k_1}\right)(1 - e^{-t(k_2/k_3)})$$

As illustrated in chart 300, as pressure is increased from 0 to 1000 psi, capacitance slowly increases. However, as pressure is decreased from 1000 psi to 0 psi, capacitance slowly decreases, and does not return to the original value immediately due to hysteresis effects.

It is noted that, although in FIGS. 5 and 8 a particular voltage divider circuit is illustrated in which a resistor 120 ($R_{sensor}$) is positioned on a high voltage side of the hose assembly 100, which has a first conductive layer 102 connected to the resistor 120 and a second layer 104 connected to ground, in alternative embodiments other circuit arrangements could be used as well. For example, a circuit could be employed in which additional components are included, or in which the voltage divider arrangement is reversed (i.e., the resistor 120 is positioned between the hose assembly 100 and ground.

Figure 10:
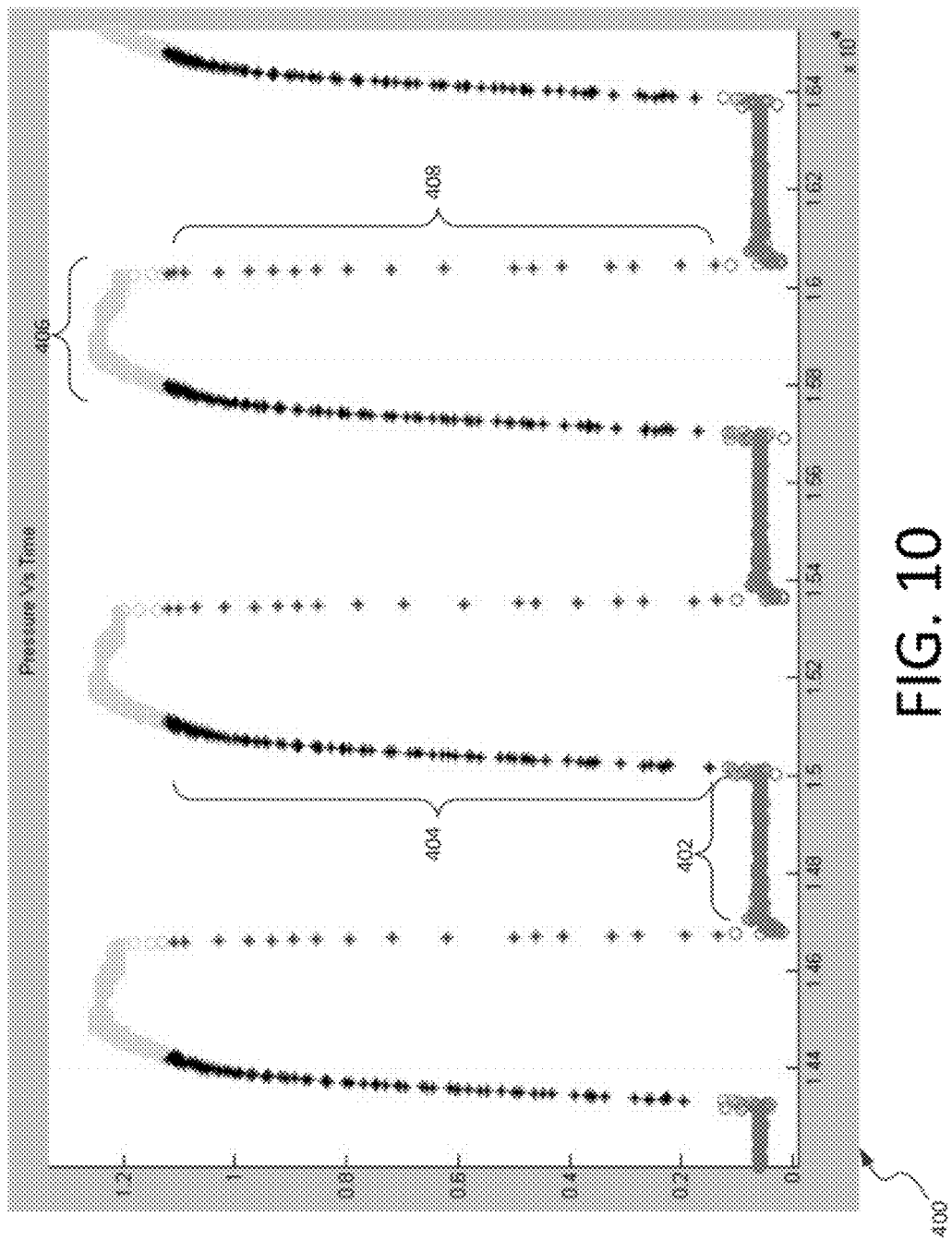
FIG. 10 is a chart illustrating an example input pressure wave applied to a hose assembly.
Figure 11:
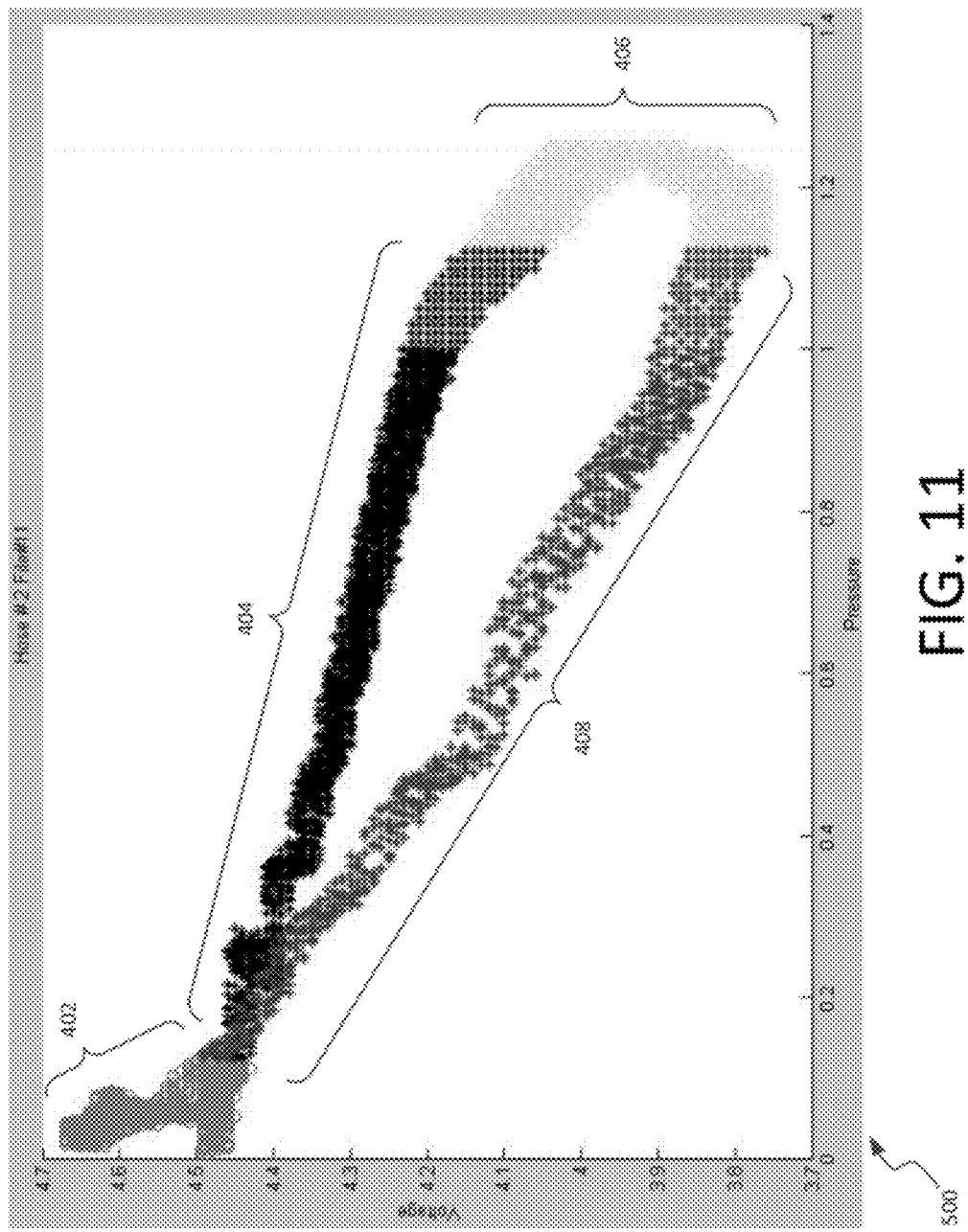
FIG. 11 is a chart illustrating a change in voltage observed at a hose in response to the input pressure wave of FIG. 11.
Figure 12:
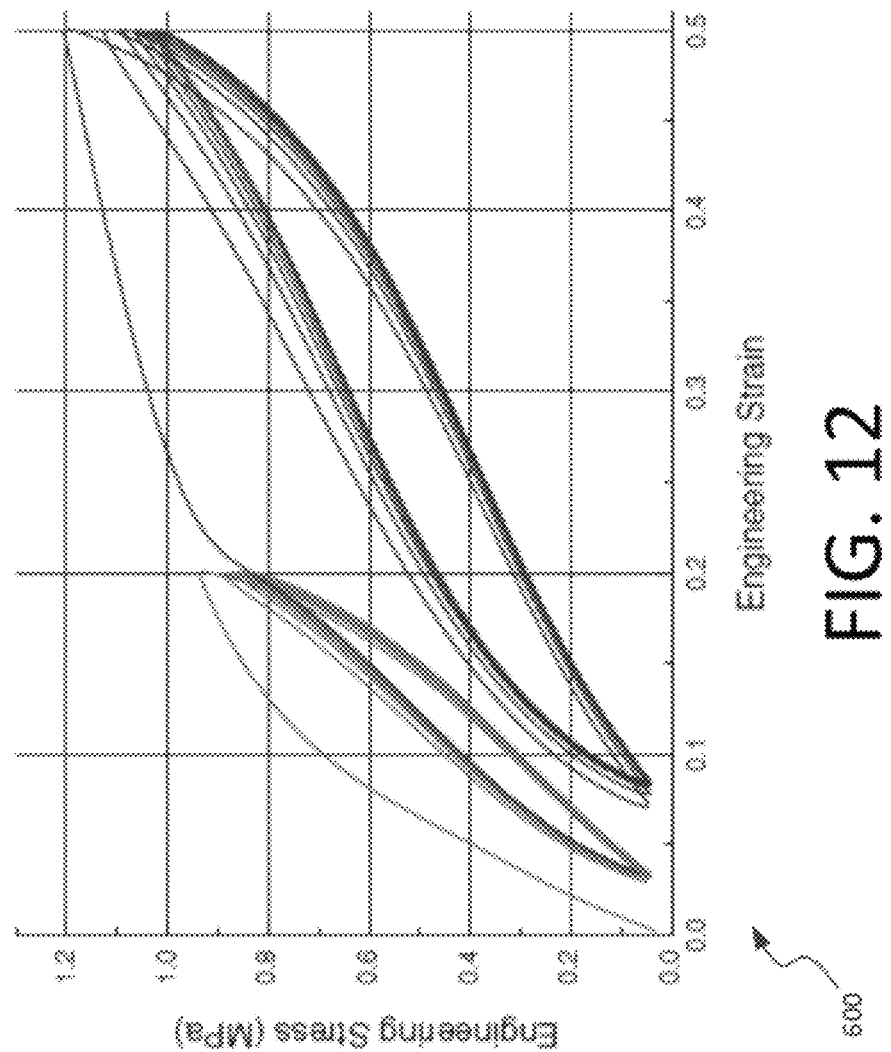
FIG. 12 is a chart illustrating example hysteresis curves illustrating responsiveness of an insulating layer included in a hose assembly based on the input pressure wave of FIG. 11.

Referring to FIGS. 10-12, additional examples of hysteresis are shown. In particular, in FIG. 10, an input pressure wave 400 is illustrated in which periodic high pressure occurrences are illustrated. In particular, the input pressure wave 300 illustrates a change from about 0.2 to about 1.2 MPa, or between about 0 and 2000 psi. As shown, the input pressure wave includes a low pressure condition 402, a rising pressure condition 404, a high pressure condition 406, and a dropping pressure condition 408.

FIG. 11 depicts a chart 500 of an output hose voltage ($V_{hose}$) compared to pressure over time. In the context of the present disclosure, it is assumed that the output hose voltage ($V_{hose}$) is about 4.5 V or above if the pressure within the hose is about 0 psi, as illustrated in region 502 (i.e., corresponding to a response to an input pressure region 402). However, as pressure is increased in the hose (e.g., in region 404 of FIG. 10), the voltage slowly drops in region 504. At a maximum pressure (in region 406), voltage continues to decrease in region 506. In a decreasing pressure region (e.g., region 408), voltage slowly increases (region 508). As can be seen in FIG. 11, at a same pressure, different voltage readings could occur based on a previous pressure within the hose assembly. As such, a chart 600 of hysteresis curves are illustrated in FIG. 12, which define a creep model analogous to that described above in FIG. 9. The creep model tracks an elastomeric compression change over time based on a previous compression, the current pressure P(t), and constants $\alpha$ and $\beta$, which are experimentally determined for each set of materials used to form the hose assembly 100. Specifically, the elastomeric compression change can be illustrated as:

$$X_2(t) = X_2(t-1) * e^{-t*\beta} + P(t) * \alpha * (1 - e^{-t*\beta})$$

As such, a hysteresis model can be applied to any hose model whose reaction is being tracked and whose hose characteristics are known, to allow for computation of a current thickness of the elastomer layer based on a tracked voltage response of the hose assembly 100 over time, and subsequently estimating an internal pressure of a hose assembly by applying a hysteresis model to the results of that elastomer layer thickness computation.

Figure 13:
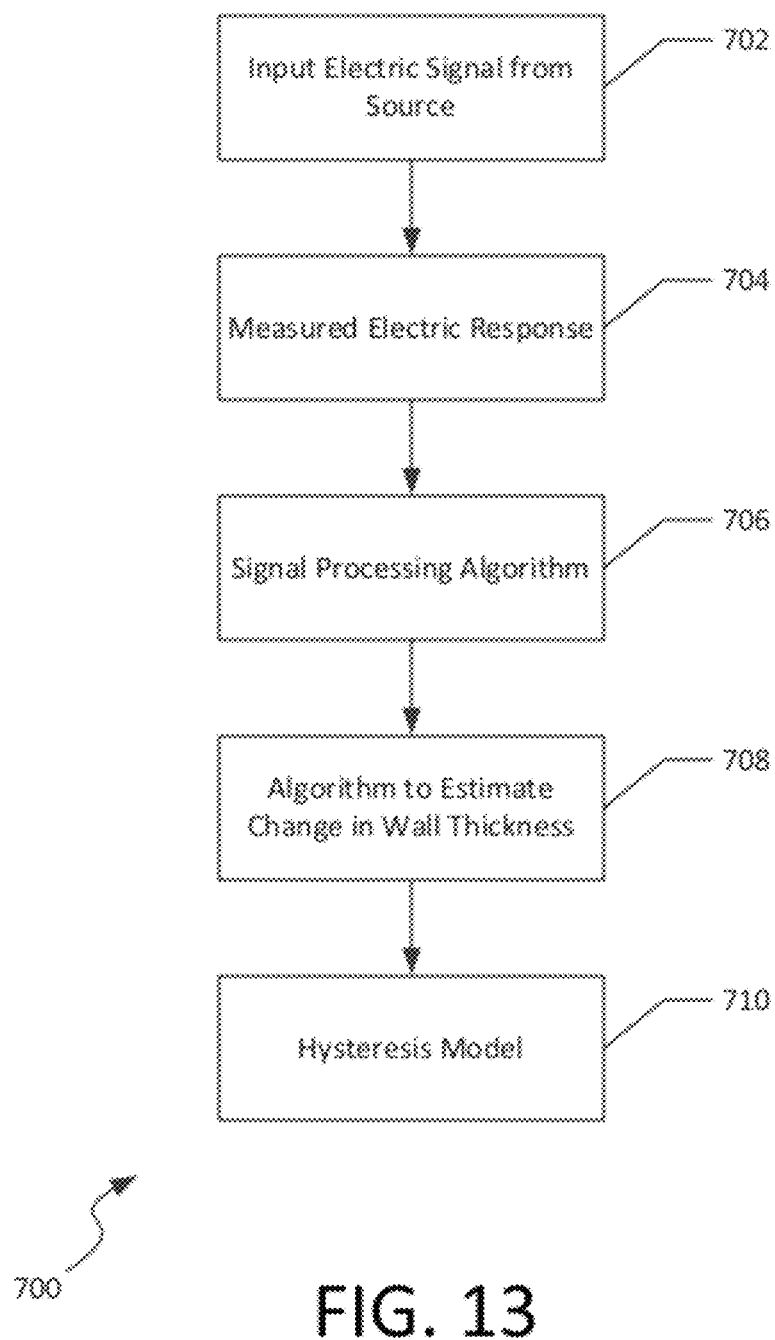
FIG. 13 is a flowchart of an method for sensing and computing an internal pressure of a hose assembly, according to an example embodiment.

Referring now to FIG. 13, a flowchart of a method 700 for sensing and computing an internal pressure of a hose assembly is shown, according to an example embodiment. The method 700 can be performed, in various embodiments, using a microcontroller associated with a hose, or a computing system communicatively connected to a signal acquisition system associated with a hose assembly 100. In embodiments where a computing system separate from the hose assembly 100 is used, the computing system could be used to manage a model of one or more hoses and provide updates regarding an estimated pressure of each hose such that abnormal pressures or other issues that may indicate failure or malfunction of the hose may be detected.

In the embodiment shown, the method 700 includes inputting an electrical signal from an electrical source onto a conductive layer of a hose assembly (step 702), and measuring a response of the hose assembly (step 704). This can include, for example, applying a voltage across the hose assembly, using a monitoring circuit such as those shown in FIGS. 5 and 8, and monitoring a change in an output voltage $V_{hose}$ as a function of time. The method 700 can also include applying a signal processing algorithm to the output voltage $V_{hose}$ to determine the electrical properties of the hose over time, including its resistance and capacitance at each time (R(t) and C(t)), for example using the estimates provided above and discussed with respect to FIG. 8 (step 706).

In the embodiment shown, the method 700 includes applying an algorithm based on the calculated estimates of resistance and capacitance over time to determine an estimated thickness of the elastomer layer that is positioned between conductive layers of the hose assembly 100 (step 708). This can include, for example, determining a change in thickness over time $X_2(t)$, as discussed above in connection with FIG. 8, and determining that effect on thickness T of the elastomer layer 106.

In some embodiments, the method 700 also includes developing an estimate of pressure within the hose assembly 100 based on the change in thickness of the elastomer layer 106 over time, using a hysteresis model derived as above (step 710).

Although in FIG. 13, the method 700 discloses applying an algorithm to determine wall thickness and a subsequent hysteresis model for determining internal pressure of a hose assembly, it is noted that in alternative embodiments models could be used which calculate pressure directly from an electrical response of the hose assembly and characteristics of the hose assembly. In such embodiments, hysteresis and/or hose thickness considerations may be built into the model of electrical response of the hose assembly.

Figure 14:
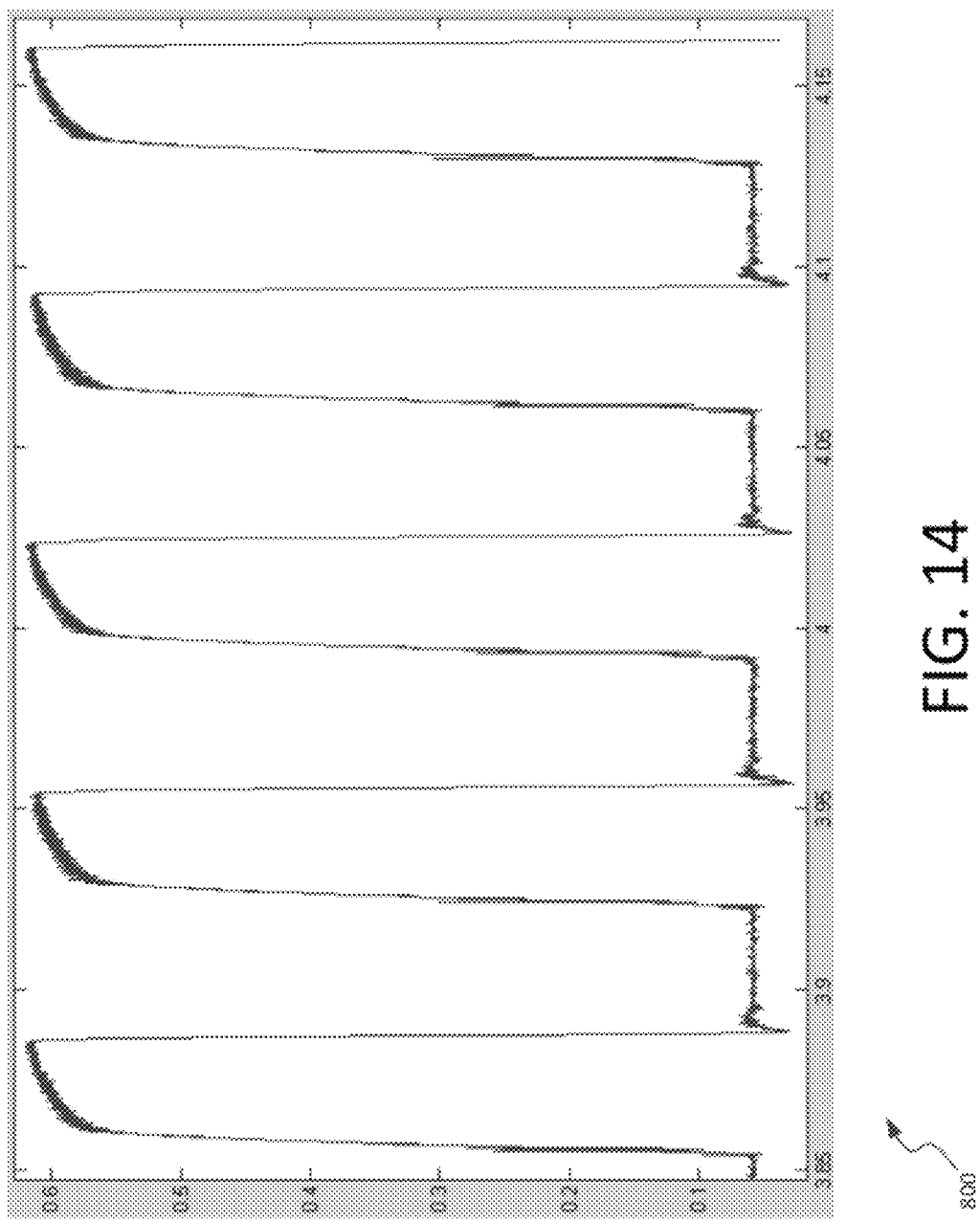
FIG. 14 is a chart illustrating an example input pressure wave applied to a hose assembly.
Figure 15:
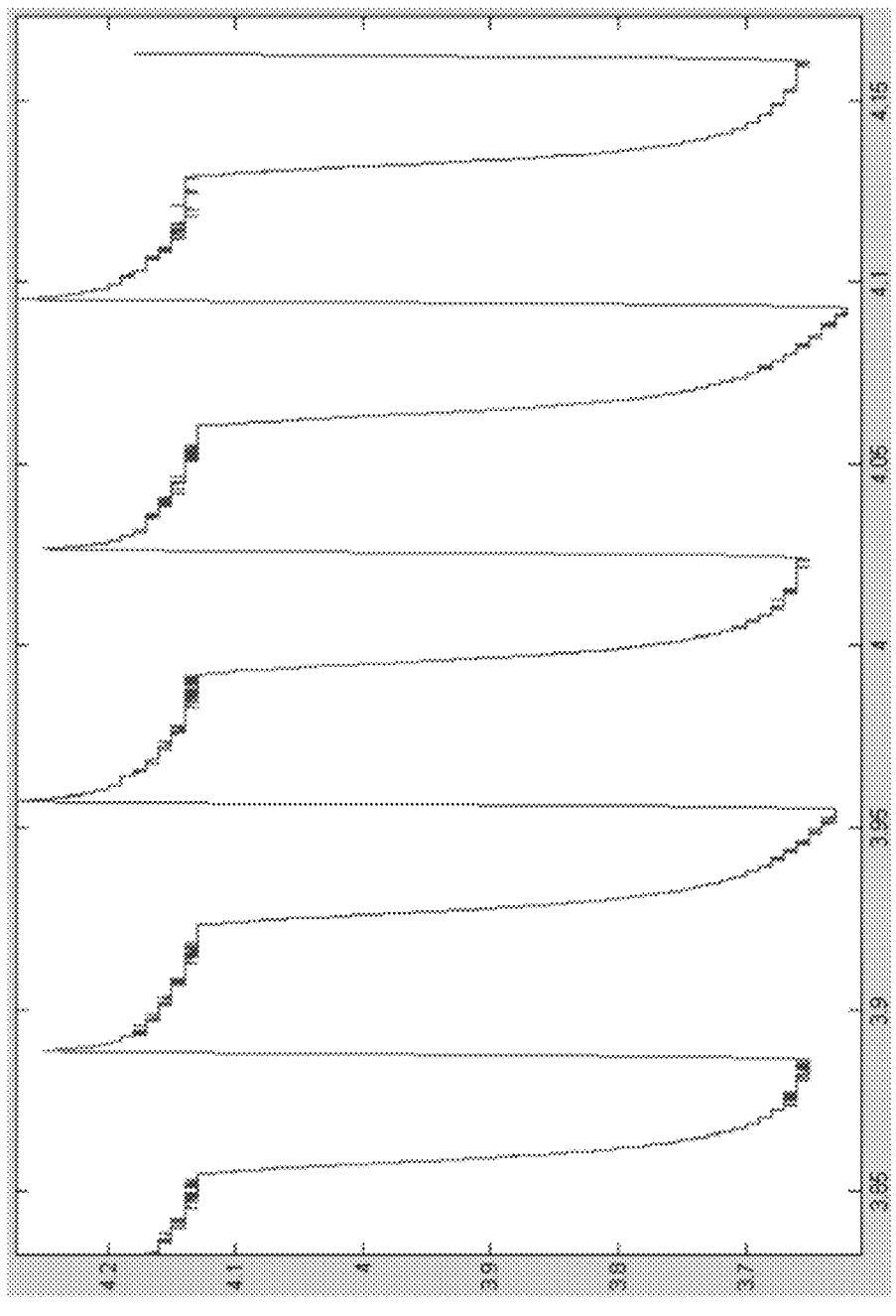
FIG. 15 is a chart illustrating an example measured voltage response of a hose assembly in response to the input pressure wave of FIG. 14.

Referring now to FIGS. 14-17, charts illustrating an example process of performing method 700 of FIG. 13 are shown using a varying input pressure wave. In FIGS. 14-17, lengths of hose of 24 and 60 inches were used. FIG. 14 illustrates a chart 800 of an input pressure wave, showing periodic changes in input pressure between 0 and 0.6 MPa. In FIG. 15, a chart 900 illustrates a voltage response at $V_{hose}$ to the change in pressure within the hose, keeping input voltage $V_{sensor}$ constant. As can be seen in the periodic response voltage shown, at a time of switching to a high pressure, the hose voltage will spike to a maximum voltage and settle back to a settling voltage representing a direct current voltage, indicating that the hose assembly capacitive effects have settled. Additionally, upon switching to the low pressure, the hose voltage will initially drop, but the voltage will drop further over time as the capacitive effect of the hose assembly 100 discharges.

Figure 16:
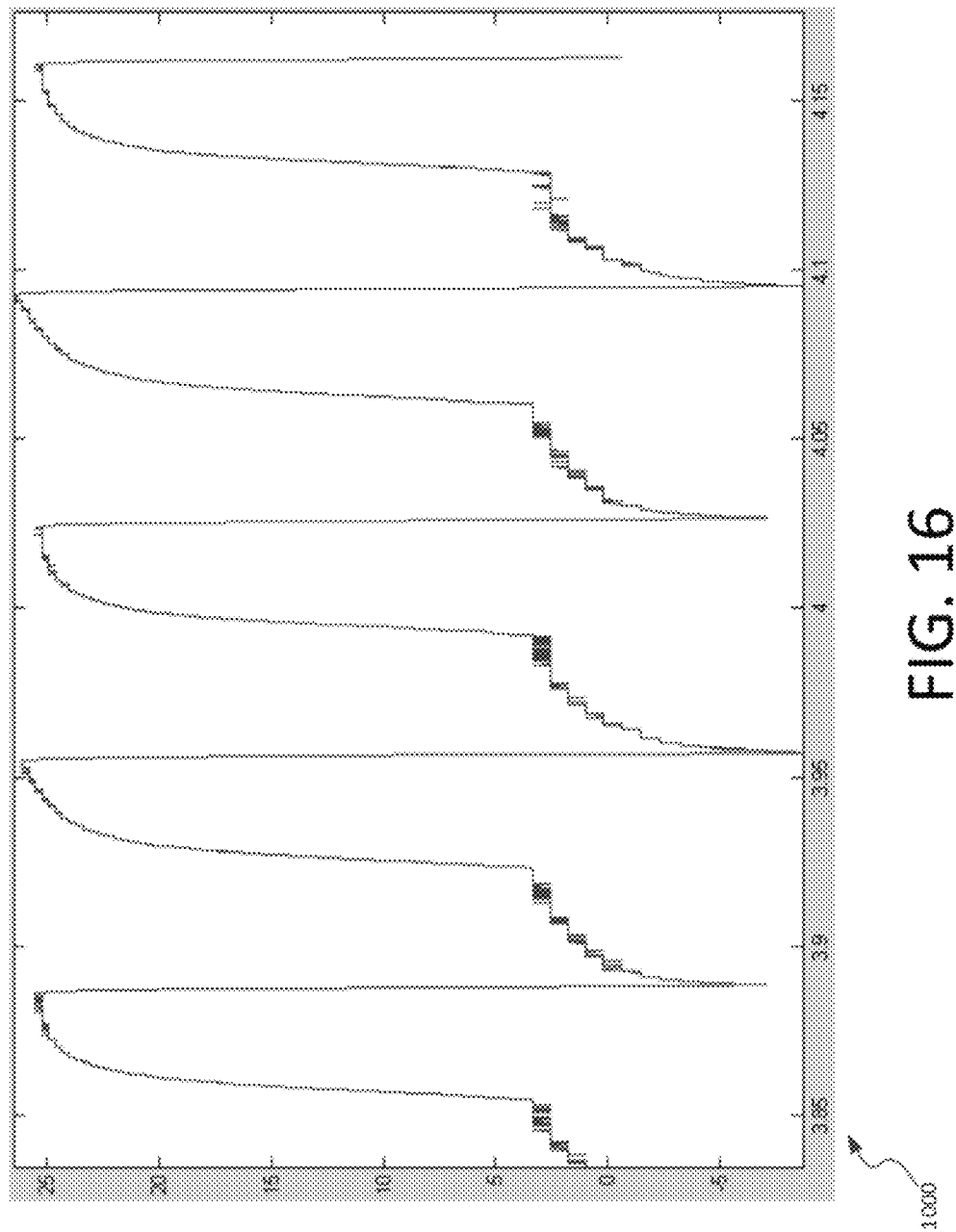
FIG. 16 is a chart illustrating estimated thickness of an elastomer layer positioned between conductive layers based on the measured voltage illustrated in FIG. 15.
Figure 17:
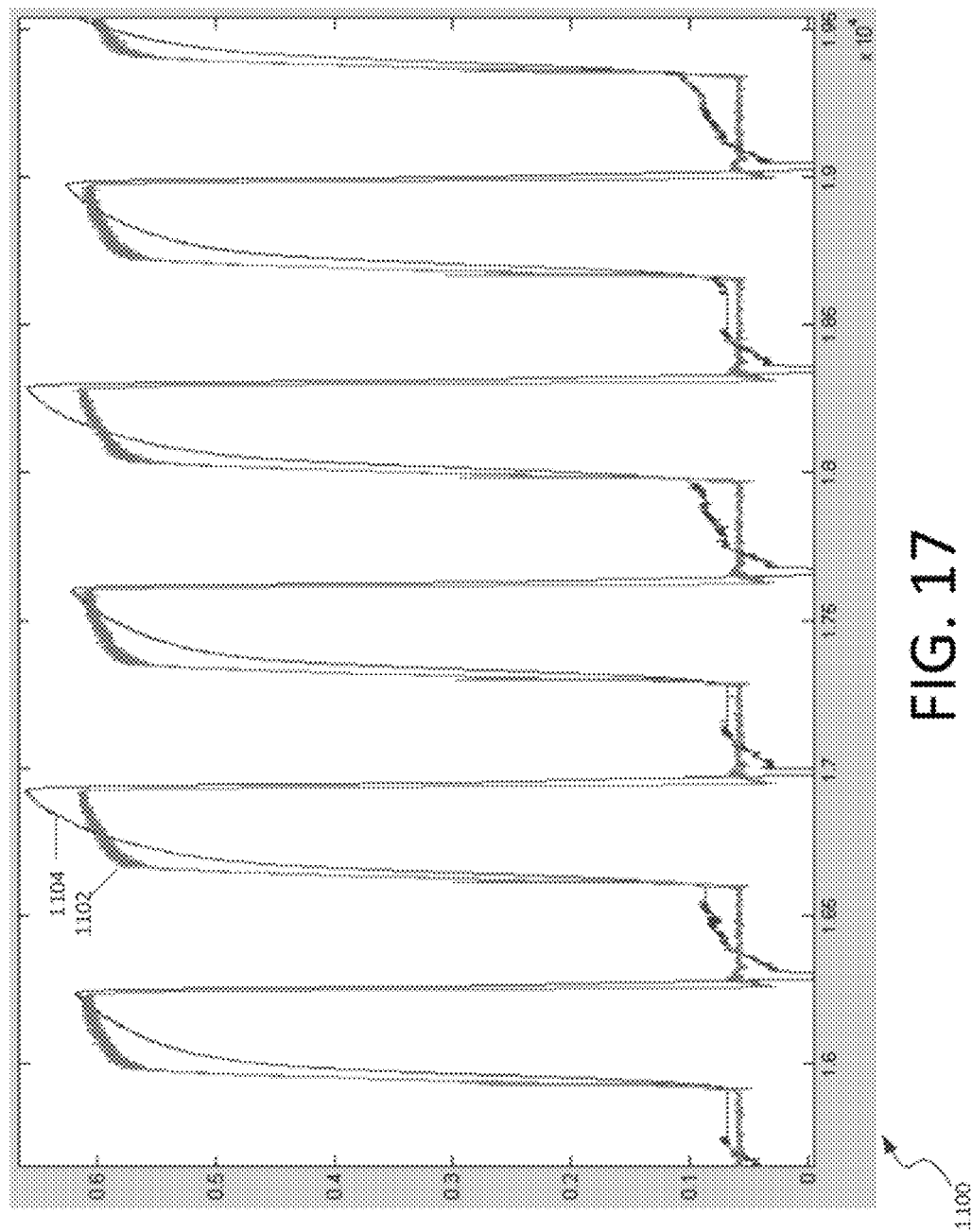
FIG. 17 is a chart illustrating estimated pressure within a hose assembly after applying a hysteresis model on the thickness calculations shown in FIG. 16.

FIG. 16 illustrates a chart 1000 of the estimated value of $X_2(t)$ based on the observed voltage and known characteristics of the hose assembly being tested. As seen in this chart, the response of $X_2(t)$ is generally inverse that of the sensed voltage $V_{hose}$ over time. Finally, to estimate pressure, a hysteresis model is applied, and the results of which are illustrated in FIG. 17. In particular, FIG. 17 shows a chart 1100 illustrating a first waveform 1102 that represents the estimated pressure based on calculations of hysteresis and elastomer layer thickness, and a second waveform 1104 illustrating an actual input pressure into the hose assembly. As seen in the chart 1100, pressure within the hose assembly can be determined with reasonable accuracy based on monitoring of a voltage response from conductive layers of a hose, since the resistive and capacitive effects of that hose can be used to determine a distance between the conductive layers. Once hysteresis in an elastomeric insulative layer between the conductive layers is compensated for, pressure within the hose can be extrapolated from mathematical models of the hose. This allows continuous monitoring of internal pressure within the hose without requiring expensive pressure sensing equipment or gauges.

Referring now to FIGS. 1-17 generally, it is noted that although in the embodiments described herein two conductive layers are discussed, in alternative embodiments within the scope of the present disclosure, the hose assembly 100 can include more than two conductive layers. In such arrangements, each of the conductive layers can be separated from adjacent conductive layers by separate insulative layers, and the resistive and capacitive features of such a hose assembly (as well as the hose construction variables) may vary accordingly, within the general concepts as disclosed herein and as encompassed by the appended claims.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A pressure-sensing hose assembly comprising:
   a hose assembly including a hose having first and second conductive layers and an insulative elastomer layer positioned between the first and second conductive layers;
   a circuit electrically connected to the first and second conductive layers of the hose assembly, the circuit generating an electrical signal across the first and second conductive layers of the hose assembly, wherein the hose assembly generates an electrical response to the electrical signal;
   a computing system configured to:
      receive the electrical response;
      calculate a hose resistance and a hose capacitance based on the electrical response; and
      estimate a pressure within the hose assembly based on the electrical response,
      wherein the computing system is configured to;
      estimate the pressure within the hose assembly by estimating a change in wall thickness of the hose assembly based at least in part on the hose capacitance and the hose resistance;
      apply a hysteresis model to the estimated change in wall thickness to estimate pressure within the hose assembly, the hysteresis model based on a previous elastomeric compression, the pressure, and one or more physical characteristics of the hose assembly; and
      output the pressure estimated based on the applied hysteresis model.

2. The pressure-sensing hose assembly of claim 1, wherein the pressure is a hydraulic pressure within the hose assembly.

3. The pressure-sensing hose assembly of claim 1, wherein the computing system is configured to apply an algorithm to estimate a wall thickness of the hose assembly, the computing system further configured to apply a hysteresis model to estimate the pressure based on a change in wall thickness over time.

4. The pressure-sensing hose assembly of claim 1, wherein the first and second conductive layers comprise concentrically disposed inner and outer conductive layers.

5. The pressure-sensing hose assembly of claim 1, wherein the wall thickness includes a thickness of the insulative elastomer layer.

6. The pressure-sensing hose assembly of claim 5, wherein the one or more physical characteristics of the hose assembly include a length of the hose and radii of the first and second conductive layers.

7. The pressure-sensing hose assembly of claim 5, wherein the one or more physical characteristics of the hose assembly include materials used in the hose assembly.

8. The pressure-sensing hose assembly of claim 1, wherein the circuit comprises a monitoring circuit including a voltage source and a scalar resistor.

9. A method of sensing an internal pressure of a hose assembly, the method comprising:

applying an electrical signal to a hose assembly;
calculating a hose resistance and a hose capacitance based on a response of the hose assembly to the electrical signal;
estimating a pressure within the hose assembly based at least in part on the response, wherein estimating the pressure within the hose assembly includes:
estimating a change in wall thickness of the hose assembly based at least in part on the hose capacitance and the hose resistance;
applying a hysteresis model to the estimated change in wall thickness to estimate pressure within the hose assembly, the hysteresis model based on a previous elastomeric compression, the pressure, and one or more physical characteristics of the hose assembly; and
outputting the pressure estimated based on the applied hysteresis model;
wherein applying an electrical signal to the hose assembly comprises applying a voltage across first and second conductive layers of the hose assembly using a monitoring circuit.

10. The method of claim 9, wherein the circuit includes a voltage source and a scalar resistor.

11. The method of claim 9, wherein the hysteresis model is empirically determined for a particular set of materials used in the hose assembly.

12. The method of claim 9, wherein the hysteresis model relates to responsiveness of a change in thickness of an elastomeric layer positioned between first and second conductive layers of the hose assembly.

13. The method of claim 12, wherein the hysteresis model is represented by the following equation:

$$X_2(t)=X_2(t-1)*e^{-t*\beta}+P(t)*\alpha*(1-e^{-t*\beta});$$

wherein $\alpha$ and $\beta$ are constants determined based on a selection of materials used to manufacture the hose assembly, $P(t)$ represents a current pressure, and $X_2(t)$ represents elastomeric compression of the hose assembly.

14. A method of sensing an internal pressure of a hose assembly, the method comprising:
applying a voltage across first and second concentric conductive layers of a hose assembly separated by an elastomeric insulating layer;
determining a voltage drop across the hose assembly;
calculating a resistance and capacitance of the hose assembly based on the voltage drop across the hose assembly;
estimating a change in wall thickness of the hose assembly based at least in part on the resistance and capacitance;
applying a hysteresis model to the estimated change in wall thickness to estimate pressure within the hose assembly, the hysteresis model based on a previous elastomeric compression, the pressure, and one or more physical characteristics of the hose assembly; and
outputting the pressure estimated based on the applied hysteresis model.

* * * * *